United States Patent [19]
Paggeot

[11] Patent Number: 4,828,235
[45] Date of Patent: May 9, 1989

[54] TORSION SPRING ASSEMBLY
[75] Inventor: Dee A. Paggeot, Muskegon, Mich.
[73] Assignee: Michigan Spring Company, Muskegon, Mich.
[21] Appl. No.: 79,243
[22] Filed: Jul. 29, 1987
[51] Int. Cl.⁴ .............................................. F16F 1/06
[52] U.S. Cl. .................................. 267/155; 267/156; 267/169; 267/275
[58] Field of Search .............. 267/155, 156, 154, 157, 267/275, 169, 291; 74/153; 261/65

[56] References Cited
U.S. PATENT DOCUMENTS
4,576,762  3/1986  Griffin et al. ........................ 267/275

Primary Examiner—Duane A. Reger
Assistant Examiner—Mark T. Le
Attorney, Agent, or Firm—Leydig, Voit & Mayer

[57] ABSTRACT

A torsion spring assembly particularly adapted for use in closing the throttle valve of an automotive throttle body or carburetor. The spring assembly includes a torsion spring having a series of intermediate coils and having reduced diameter end coils. Telescoped into each end of the spring and gripped by the reduced diameter end coils in the sleeve of a bushing having a radially extending flange which captivates the spring against axial movement.

3 Claims, 1 Drawing Sheet

U.S. Patent
May 9, 1989
4,828,235
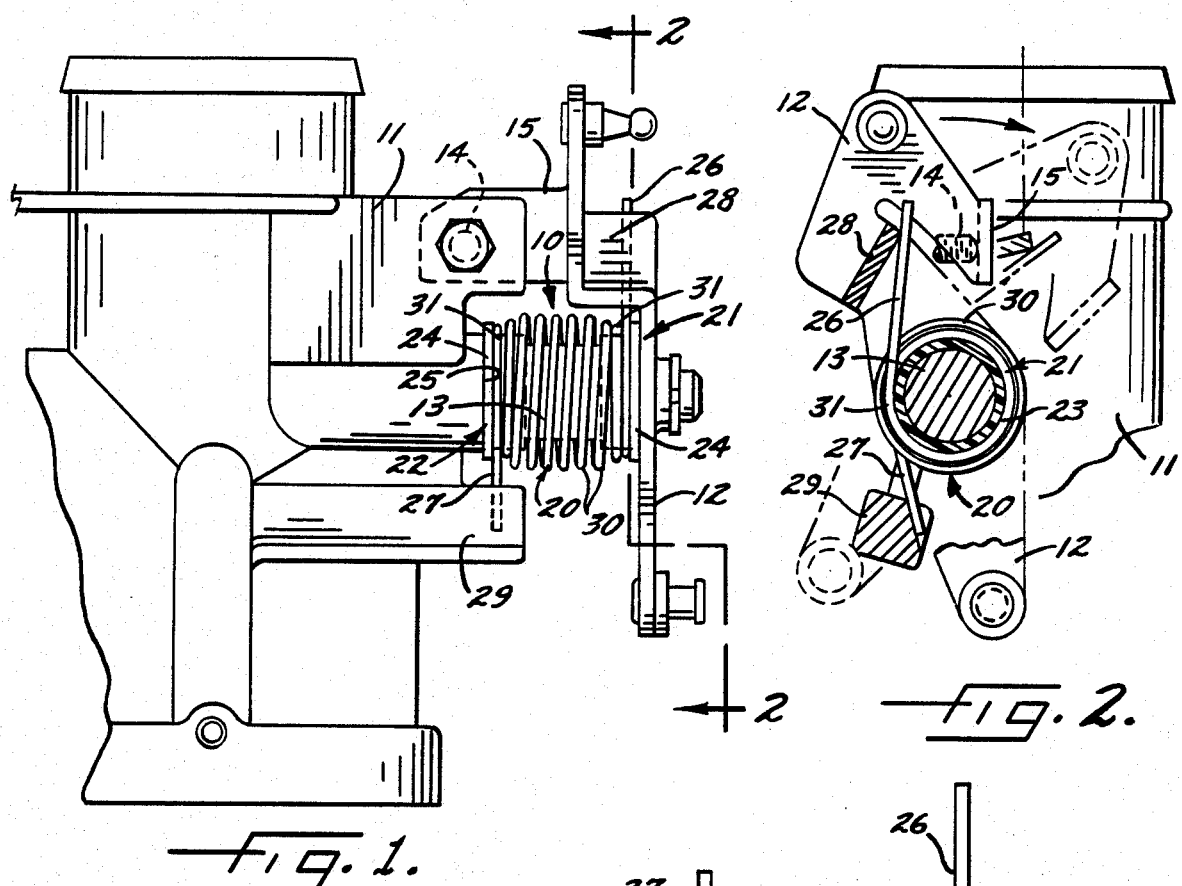
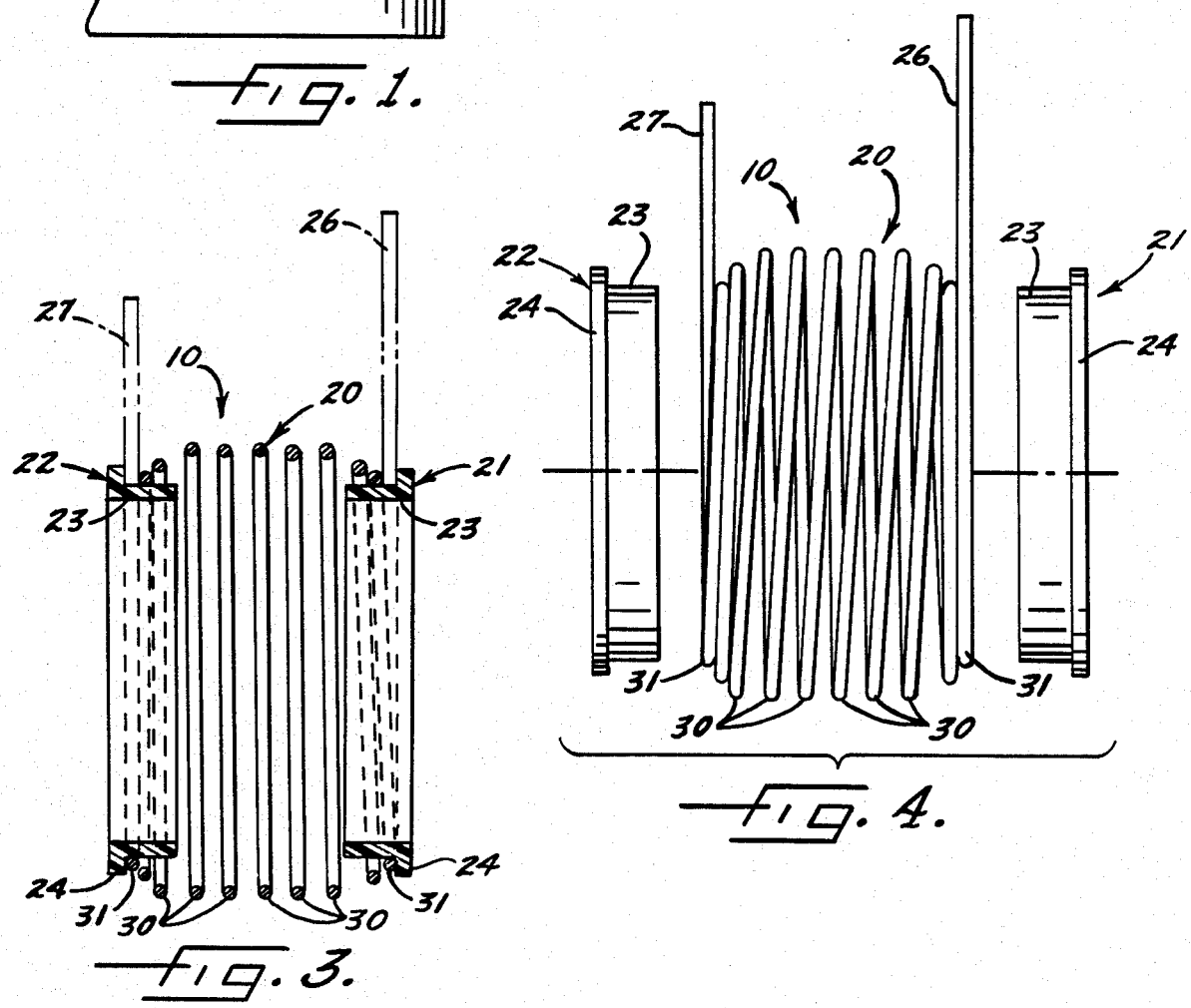

4,828,235

TORSION SPRING ASSEMBLY

BACKGROUND OF THE INVENTION

This invention relates to a torsion spring assembly having a torsion spring which, when loaded torsionally, exerts a biasing force on a member associated with the spring. The invention more particularly relates to a torsion spring of the type which is defined by a plurality of helically wound coils and by two radially projecting end tangs, the spring being loaded torsionally when one of the end tangs is moved angularly relative to the other end tang.

While the spring assembly of the invention may be used in various applications, it is particularly suitable for use in effecting closure of the throttle valve of the throttle body or carburetor of an automotive internal combusion engine. Previous torsion springs which have been used for this purpose most usually comprise a conventional coiled spring telescoped rather loosely over a bushing on a shaft and having one end tang which is anchored and another end tang which is connected to the throttle valve actuator. Conventional torsion springs of this type experience excessive coil cant and friction, produce an axial and radial sawing action and cause excessive wear of the bushing and the shaft.

SUMMARY OF THE INVENTION

The general aim of the present invention is to provide a new and improved torsion spring assembly having a torsion spring whose coils, when wound, remain substantially uniform without any substantial canting and without causing any substantial friction, sawing action or wear.

Another object of the invention is to provide a torsion spring assembly having bushings which keep the spring coils concentric with a shaft and which may be sold and shipped as a unit with the spring.

A more detailed object is to achieve the foregoing by providing a spring assembly having two flanged bushings adpated to be telescoped into the end portions of the spring, the end coils of the spring being of reduced diameter and being capable of tightly gripping the bushings.

These and other objects and advantages of the invention will become more apparent from the following detailed description when taken in conjunction with the accompanying drawings.

BRIEF DESCRIPTION OF THE DRAWINGS

FIG. 1 is an elevational view of a typical throttle body equipped with a new and improved torsion spring assembly incorporating the unique features of the present invention.

FIG. 2 is a fragmentary cross-section taken substantially along the line 2—2 of FIG. 1.

FIG. 3 is an enlarged cross-section taken axially through the spring assembly.

FIG. 4 is an exploded elevational view of the spring assembly shown in FIG. 3.

DETAILED DESCRIPTION OF THE PREFERRED EMBODIMENT

For purposes of illustration, the spring assembly 10 of the present invention is shown in the drawings in conjunction with the throttle body 11 of an automotive internal combustion engine. Briefly, the throttle body includes a lever 12 supported to rotate about the axis of a shaft 13 (FIG. 2). Clockwise rotation of the lever 12 from the position shown in solid lines in FIG. 2 to the position shown in phantom lines effects opening of the throttle valve (not shown) of the throttle body 11 while reverse rotation of the lever by the spring assembly 10 effects closing of the throttle valve. An adjustable stop screw 14 on the throttle body engages a lug 15 on the lever to establish the closed position of the throttle valve. Reference is made to Blanchard et al U.S. Pat. No. 4,582,653 for a more detailed disclosure of a typical throttle body equipped with a spring assembly for returning a throttle vale toward a closed position.

The present invention contemplates the provision of a new and improved spring assembly 10 which includes a coiled torsion spring 20 and which is uniquely constructed to avoid excessive coil cant, coil friction and coil sawing action. Moreover, the spring assembly is maintained in relatively precise concentric relation with the shaft 13 so as to substantially eliminate wearing of the shaft.

More specifically, the spring assembly 10 includes a pair of end bushings 21 and 22 (FIGS. 3 and 4) which preferably are molded of plastic. The two bushings are identical to one another and each includes a cylindrical sleeve 23. A flange 24 is formed integrally with and projects radially outwardly from the outboard end of each sleeve.

When the spring assembly 10 is assembled with the throttle body 11, the sleeves 23 of the bushings 21 and 22 telescope over the shaft 13 with a close fit. The bushing 21 is captivated axially by virtue of the outboard end of its flange 24 engaging the inboard side of the lever 12. The outboard end of the flange 24 of the bushing 22 engages a shoulder 25 (FIG. 1) on the throttle body 11 to prevent the bushing 22 from moving axially away from the bushing 21.

The torsion spring 20 is wound helically from round music wire and is formed with two radially projecting end tangs 26 and 27. The tang 26 engages a movable member which herein is in the form of bent section 28 (FIGS. 1 and 2) of the lever 12. The tang 27 engages a fixed stop member or finger 29 on the throttle body 11. When the lever 12 is turned clockwise, the tang 26 is moved angularly relative to the tang 27 in a direction causing torisional loading of the spring.

In carrying out the invention, the helically wound spring 20 includes intermediate coils 30 of a predetermined diameter and end coils 31 having an inner diameter substantially less than the inner diameter of the intermediate coils. Herein, the spring 20 includes approximately five intermediate coils 30 having an inner diameter of approximately 1.5 inches. The reduced diameter end coils 31 at the ends of the spring have a minimum inner diameter of about 1.3 inches, the reduced diameter coils at each end of the spring extending through at least one full turn and preferably through more than one full turn.

As shown in FIG. 3, the sleeves 23 of the bushings 21 and 22 are telescoped into the end portions of the spring 20 and are gripped tightly by the reduced diameter end coils 31. Such gripping is effected by virtue of the outside diameter of the sleeves 23 being somewhat greater than the inside diameter of the end coils 31 so as to cause the end coils to contract around the sleeves when the bushings are telescoped into the end portions of the spring. The inboard side of each flange 24 engages the outboard end of the immediately adjacent end coil 31 to limit the extent to which the sleeve 23 telescopes into the spring.

With the foregoing arrangement, the bushings 21 and 22 may be assembled with the spring 20 at the facility of the spring manufacturer and thus the entire spring assembly 10 may be packaged and shipped as a unit. When the assembly 10 is installed on the shaft 13, the bushings 21 and 22 keep the spring in concentric relation with the shaft and hold the coils 30 out of engagement with the shaft. When the spring is wound torsionally by clockwise angular movement of the tang 27, the coils 30 remain in concentric and radially spaced relation with the shaft. As a result, the coils 30 remain in substantially uniform relation with the shaft without any coil cant and without frictionally engaging the shaft. Also, the bushings keep the coils from sawing linearly and circumferentially against the shaft. Accordingly, wear of the shaft is virtually eliminated.

I claim:

1. A torsion spring assembly comprising a coiled helical torsion spring having first and second end cols and having multiple intermediate coils located between said end coils, and plurality of adjacent ones of said intermediate coils having a uniform inner diameter, a tang extending directly tangentially from each of said end coils, said spring being torsionally loaded when one of said tangs is moved angularly relative to the other of said tangs, first and second bushings having generally cylindrical sleeves telescoped into the end portions of said spring, said first and second end coils each having an inner diameter less than the inner diameter of said plurality of intermediate coils and constantly contracted tightly around the sleeves of said first and second bushings, respectively, so as to frictionally hold said sleeves in telescoped relation with the end portions of said spring, and first and second flanges formed integrally with and projecting radially outwardly from the outboard ends of the sleeves of said first and second bushings, respectively, and engaging said first and second end coils so as to limit telescoping of said sleeves into the end portions of said spring, said tangs being located at the extreme inboard sides of said flanges and projecting radially outwardly from said flanges whereby one of said tangs is exposed for direct engagement with a fixed member and the other of said tangs is exposed for direct engagement with a movable member.

2. A torsion spring assembly as defined in claim 1 in which each of said end coils extends angularly around the respective sleeve through more than 360 degrees.

3. A spring as defined in claim 2 in which at least four adjacent ones of said intermediate coils have a uniform inner diameter.

* * * * *